W. W. NEIGHBOUR.
ANTIFRICTION BEARING.
APPLICATION FILED JUNE 21, 1913.
1,136,161.
Patented Apr. 20, 1915.
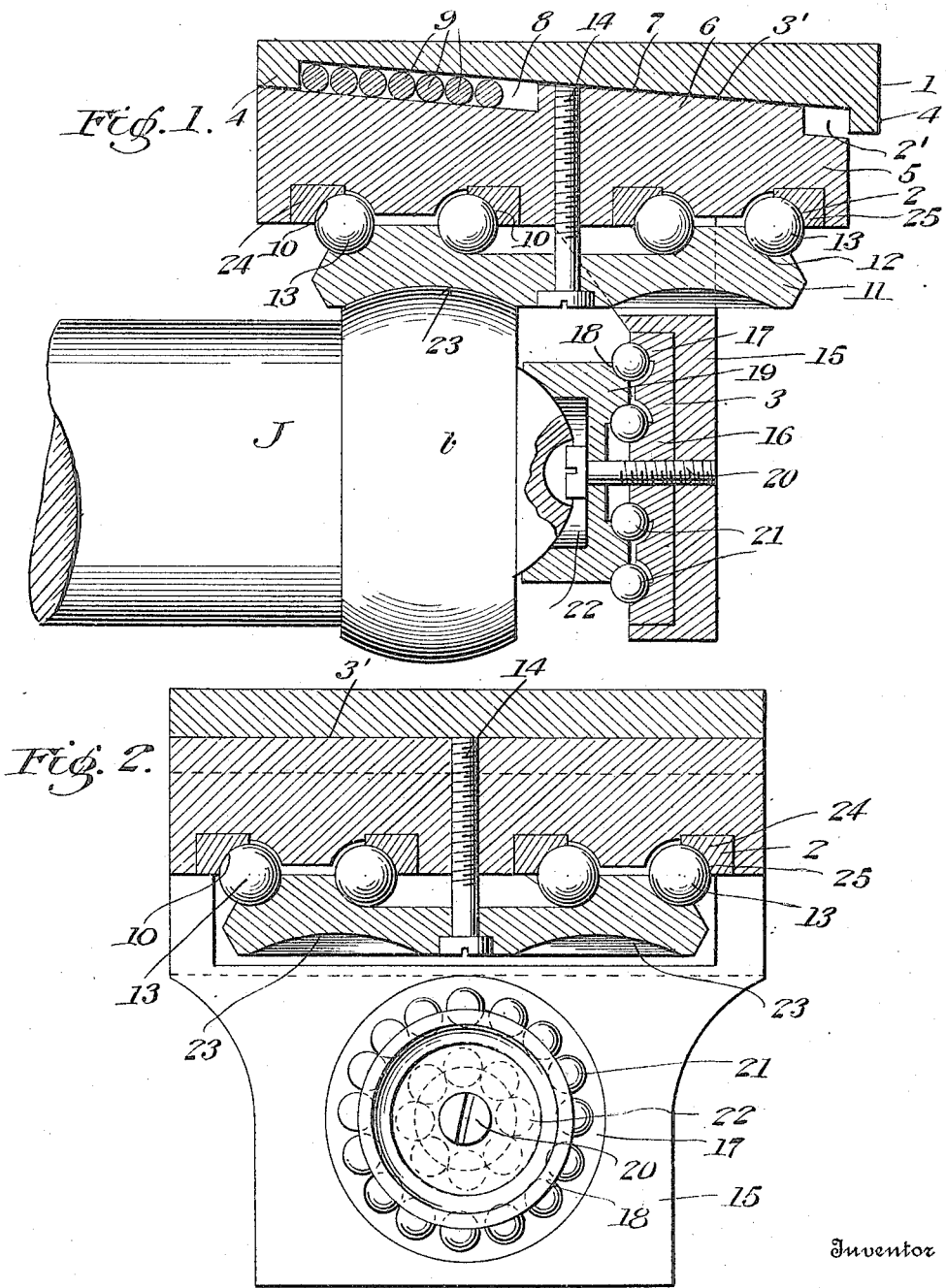
Witnesses
Frederic W. Ely.
John J. McCarthy
Inventor
W. W. Neighbour
By Victor J. Evans
Attorney

UNITED STATES PATENT OFFICE.

WILLIAM W. NEIGHBOUR, OF SANDUSKY, OHIO.

ANTIFRICTION-BEARING.

1,136,161.            Specification of Letters Patent.      Patented Apr. 20, 1915.

Application filed June 21, 1913. Serial No. 775,129.

*To all whom it may concern:*

Be it known that I, WILLIAM W. NEIGHBOUR, a citizen of the United States, residing at Sandusky, in the county of Erie and State of Ohio, have invented new and useful Improvements in Antifriction-Bearings, of which the following is a specification.

This invention relates to improvements in antifriction bearings and has particular application to a combination thrust and radial bearing.

In carrying out the present invention, it is my purpose to provide a bearing of the class described which will be found especially useful in connection with propeller shafts, car journals, line shafts and the like.

It is also my purpose to provide a combination thrust and radial bearing wherein the raceways receiving the anti-friction bodies will be constructed in such manner as to prevent the accumulation of grit, dust and the like and whereby any grit, finding its way into the bearings, will be discharged therefrom, thereby increasing the life and efficiency of the bearing.

With the above and other objects in view, the invention consists in the construction, combination and arrangement of parts hereinafter set forth in and falling within the scope of the claim.

In the accompanying drawing; Figure 1 is a cross sectional view through a bearing constructed in accordance with the present invention. Fig. 2 is a similar view taken at right angles to Fig. 1.

In the present instance, I have shown my invention as adapted for car journals. It is to be understood, however, that such changes in the arrangement of the various parts of the combination bearing, may be made in order to adapt the invention to line shafts, propeller shafts and the like, without departing from the spirit of the invention or exceeding the scope of the claim.

Referring now to the accompanying drawing in detail, the numeral 1 designates a body supporting plate, while 2 indicates the radial bearing and 3 the thrust bearing. In the present instance, the under surface of the supporting plate 1 is formed with a transverse groove 2′ having an inclined top wall 3′, studs 4, 4 depending from the under surface of the plate at opposite ends of the groove 2′ therein.

The radial bearing 2 comprises a base plate 5 having the upper surface thereof formed with a transversely extending rib 6 disposed within the groove 2′ and relatively short as compared with the length of the groove, the upper surface of such rib being inclined as at 7 to coöperate with the confronting face of the groove. The rib 6 has the relatively high end thereof formed with a longitudinally extending way 8 in which are mounted anti-friction bodies herein shown to be in the form of rollers 9 or balls contacting with the adjacent portion of the inclined face 7 of the groove. By means of this construction, it will be seen that the car body may move laterally relatively to and upon the base plate 5 in order to eliminate vibration and will be automatically returned to normal position under the action of gravity. Formed in the under face of the base plate 5 of the radial bearing are concentrically disposed annular raceways 10, 10, the raceways 10, 10 being semi-cylindrical in cross section.

The numeral 11 designates a rotatable member of the radial bearing formed, in the present instance, of a disk-like member having the upper surface thereof cut out to provide concentrically disposed raceways 12 coöperating with the raceways 10, 10 to receive anti-friction balls 13 or rollers, the member 11 rotating about a pin 14 passed through the center thereof and into the base 5.

Depending from the opposite longitudinal edges of the base 5 and disposed in a plane at right angles to the radial bearing is a bracket 15 carrying the thrust bearing 3. This thrust bearing, in the present instance, is formed of a base plate 16 set into the bracket 15 and having the outer face thereof provided with concentrically disposed raceways 17 alining with similar ways 18 formed in a rotating member 19 rotatable about a pin 20 passed through the center thereof and through the similar portion of the base plate 16 and into the bracket. These coöperating raceways receive anti-friction balls 21 or rollers, while the outer face of the revolving member 19 of the thrust bearing is cupped as at 22 so as to receive the respective end of the car journal J, such end of the journal having a boss *b* formed thereon and designed to ride within a convexed groove 23 formed in the under face of the rotatable member 11 of the radial bearing.

It will be seen that the anti-friction bearings 21, being seated within concentrically disposed raceways, take the pressure of the car journal at right angles to the line of thrust thereby facilitating the rotation of the plates within the ways and eliminating a direct thrust upon the base plate 16.

One half of each raceway 10, 10 of the radial bearing and one half of each raceway 17, 17 of the thrust bearing is formed of a block 24 set into the respective base plate and having the concaved surface 25 disposed in a plane within that of the other half of the raceway so that the balls or rollers will bear against one half of the raceway only thereby enabling any grit, dirt and other foreign matter to work its way out of the bearing.

From the foregoing description taken in connection with the accompanying drawing, the construction, mode of operation and manner of employing my invention will be readily apparent. It will be seen that the body supporting plate enables the car to move from side to side, that is to say, laterally so as to take up any vibration, shock or jar, while such body will automatically resume its normal position incident to the inclined confronting faces of the rib and groove, the rollers or balls between such faces facilitating the relative movement of these members and reducing the friction between the parts. It will be seen that I have provided a combination thrust and radial bearing wherein the possibility of grit, dirt and the like accumulating between the members is avoided, while journals and shafting may rotate with a minimum friction.

While I have herein shown and described one preferred form of my invention by way of illustration, I desire to have it understood that I do not limit or confine myself to the precise details of construction herein described and delineated, as modification and variation may be made within the scope of the claim without departing from the spirit of the invention.

I claim:

The combination with a vertical bracket, of a thrust bearing comprising a base plate having one face thereof placed in face to face contact with said bracket and the opposite face formed with concentrically disposed ways, a member capable of rotation and having one face thereof formed with concentrically disposed ways coöperating with the first ways, anti-friction bodies within said ways, and a pin passed through said base plate and member at the axes thereof and threaded into said bracket whereby the member may be rotated upon the base plate and the bearing is secured to the bracket, the outer face of said member being cupped to receive a car journal.

In testimony whereof I affix my signature in presence of two witnesses.

WILLIAM W. NEIGHBOUR.

Witnesses:
HAROLD W. WOODROW,
GEORGE R. MORAN.

Copies of this patent may be obtained for five cents each, by addressing the "Commissioner of Patents, Washington, D. C."